(12) United States Patent
Oh

(10) Patent No.: US 8,671,156 B2
(45) Date of Patent: Mar. 11, 2014

(54) METHOD AND APPARATUS FOR PROVIDING COMMUNICATION HISTORY

(75) Inventor: Gyu-Bong Oh, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 511 days.

(21) Appl. No.: 12/627,853

(22) Filed: Nov. 30, 2009

(65) Prior Publication Data
US 2010/0138516 A1    Jun. 3, 2010

(30) Foreign Application Priority Data

Nov. 28, 2008 (KR) ........................ 10-2008-0120162

(51) Int. Cl.
*G06F 15/16* (2006.01)
*H04W 4/00* (2009.01)

(52) U.S. Cl.
USPC .......................................... 709/217; 709/206

(58) Field of Classification Search
USPC ............ 709/217–219, 206; 455/412.1, 412.2, 455/413, 414.1, 414.3; 379/93.01–93.29, 379/93.31–93.37, 121.04
See application file for complete search history.

(56) References Cited

U.S. PATENT DOCUMENTS

| 6,671,508 B1 | 12/2003 | Mitsuoka et al. | |
|---|---|---|---|
| 7,139,827 B1 * | 11/2006 | Iwayama et al. | 709/227 |
| 7,236,579 B2 | 6/2007 | Mansfield | |
| 7,711,815 B2 * | 5/2010 | Garg et al. | 709/224 |
| 2004/0119761 A1 * | 6/2004 | Grossman et al. | 345/854 |
| 2005/0210113 A1 | 9/2005 | Kasuga et al. | |
| 2007/0153773 A1 | 7/2007 | Miyata et al. | |
| 2008/0059627 A1 * | 3/2008 | Hamalainen et al. | 709/224 |
| 2008/0065647 A1 * | 3/2008 | Hinohara | 707/10 |

FOREIGN PATENT DOCUMENTS

| CN | 1671105 | 9/2005 |
|---|---|---|
| CN | 1731731 | 2/2006 |
| CN | 101051922 | 10/2007 |
| CN | 201210691 | 3/2009 |
| JP | 2000-287249 | 10/2000 |
| JP | 2001-197562 | 7/2001 |
| JP | 2003-289399 | 10/2003 |
| JP | 2007-068102 | 3/2007 |
| JP | 2007-184672 | 7/2007 |
| JP | 2007-251535 | 9/2007 |
| JP | 2008-160281 | 7/2008 |
| JP | 2008-219461 | 9/2008 |
| KR | 1020060012736 | 2/2006 |
| KR | 1020060013152 | 2/2006 |
| KR | 1020070078458 | 8/2007 |

* cited by examiner

*Primary Examiner* — Ruolei Zong
(74) *Attorney, Agent, or Firm* — The Farrell Law Firm, P.C.

(57) ABSTRACT

A method and apparatus for providing a communication history of a terminal in a Session Initiation Protocol/Internet Protocol (SIP/IP) core network. When a user having a plurality of terminals sends a subscribe request for a communication history of the terminals to a server, the server transmits all communication history information associated with the plurality of terminals to any one of the terminals each time the communication histories associated with the terminals are newly registered. The terminal, which has received the communication history information, can request and receive presence information of a corresponding terminal, which is included in the communication history information, if needed.

22 Claims, 6 Drawing Sheets

METHOD AND APPARATUS FOR PROVIDING COMMUNICATION HISTORY

PRIORITY

This application claims priority under 35 U.S.C. §119(a) to a Korean Patent Application filed in the Korean Intellectual Property Office on Nov. 28, 2008 and assigned Serial No. 10-2008-0120162, and a Korean Patent Application filed in the Korean Intellectual Property Office on Dec. 5, 2008 and assigned Serial No. 10-2008-0123631, the entire disclosures of which are hereby incorporated by reference.

BACKGROUND OF THE INVENTION

1. Field of the Invention

The present invention relates generally to a Converged Address Book (CAB) service in a Session Initiation Protocol/Internet Protocol (SIP/IP) core network. More particularly, the present invention relates to a method and apparatus for managing communication histories of mobile terminals using a CAB service.

2. Description of the Related Art

A CAB service in an SIP/IP core network is a single network-based address book service for allowing a user to store available address information in various terminals and to access this information with any device at anytime and anyplace, and for synchronizing the address information.

A conceptual structure of CAB proposed by Open Mobile Appliance (OMA) CAB Group includes, as illustrated in FIG. 1, a CAB client 100, a CAB server 120, a contact control server 130, and a eXtended Make-up Language (XML) Document Management Server (XDMS) 140.

The CAB client 100, which communicates with the CAB server 120 on a terminal, transmits, to the CAB server 120, information regarding CAB user authentication, synchronizes a Personal Contact Card (PCC) and a CAB stored in a network storage, and maintains requirements of a CAB user, for example, address subscription, address finding, address sharing, interaction with an old address book, management of user preference, or the like.

The CAB server 120, which is a major network element in the CAB architecture, handles CAB user requirements received from the CAB client 100. A key function of the CAB server 120 includes receiving updated address information from functions such as mutual authentication on a CAB client, storage of CAB addresses, synchronization of address information, and address subscription, and reflecting the updated address information in the address book.

The contact control server 130 is a network element that reflects address subscription/sharing/change and user preference/policy, and its major functions include an address subscription function of withdrawing CAB user preference-related XML documents from a CAB user preference/policy XDMS and receiving a subscribe request from a CAB user, an address share function of applying personal preferences of data received through the address subscription, reflecting the personal preferences in an address book, maintaining subscription state information, and sharing a PCC or a CAB, and an interworking function (IWF) of interworking with the legacy address book system, or exposing an interface to an external enabler.

The XDMS 140 managing user data includes a CAB XDMS for storing a CAB, a CAB user preference/policy XDMS for storing user preference and policy, a CAB Contact Status XDMS for distinguishing CAB users from the existing users, a CAB Contact Share XDMS for storing an address book shared by others, a PCC XDMS for storing PCC information, Communication History XDMS for storing communication history and so forth. Aside from these, the XDMS 140 may include an XDMS for accessing various XDMS functions, and an SIP/IP core network for message routing with entities in an external domain.

An example of communication between a recipient having a plurality of terminals and a sender will be described with reference to FIG. 2. In the example shown in FIG. 2, a recipient having several terminals communicates with a sender in a CAB service. In FIG. 2, a receiving-side user A having a plurality of terminals establishes an audio session in response to a communication request from a sending-side user B 240, which is received at first terminal #1 200 in steps 201, 203 and 205. Here, user B 240 may constitute a user group. After achieving a desired object (e.g. call, Short Message Service (SMS), messenger service, etc.) between a recipient and a sender, the user A closes the session to user B 240 in steps 207 and 209. As the session is closed, a communication history for this communication is recorded in both of the first terminal #1 200 of user A and a terminal of user B 240 in steps 215 and 245. However, in the current CAB service, when a second terminal #2 220 of user A sends a request for session establishment to user B 240, the second terminal #2 220 cannot find the communication history recorded in the first terminal #1 200 of user A, so user A cannot make smooth communication with user B 240 that uses the communication history in step 225. In addition, if the contact address of user B 240 is not stored in a CAB address book, user A cannot initiate communication with user B 240 unless user A checks the communication history of the first terminal #1 200.

As stated above, when a recipient having a plurality of terminals attempts communication with a sender with a second terminal after communicating with the sender using a first terminal, the recipient cannot acquire information about a communication history with the existing sender unless the user checks the communication history using the terminal that first communicated with the sender, and the current CAB service also does not provide this information, causing a great hindrance in smooth communication of users having a plurality of terminals. Therefore, there is a long-felt need for a method capable of collectively managing the communication histories existing in the plurality of terminals in the CAB service.

SUMMARY OF THE INVENTION

An aspect of the present invention is to address at least the above-mentioned problems and/or disadvantages and to provide at least the advantages described below. Accordingly, an aspect of the present invention provides a method and apparatus in which a user having a plurality of terminals can perform smooth communication with a desired recipient using a converged communication history.

Another aspect of the present invention provides a data transmission/reception method and apparatus for removing the inconvenience a multi-terminal user may experience when sporadically using communication histories existing in different terminals, by providing a converged communication history in a CAB system, so that a CAB service can be provided fast and easily according to a decision made by the multi-terminal user.

According to one aspect of the present invention, there is provided a method for receiving a communication history by a terminal in a communication system. The method includes sending a subscribe request for a communication history to a server; and receiving, from the server, communication history information of all terminals registered in association with a user of the terminal, and storing the received communication history information.

According to another aspect of the present invention, there is provided a method for providing a communication history to a terminal in a communication system. The method includes receiving a request for a communication history from a terminal; and transmitting communication history information of all terminals registered in association with a user of the terminal, to one of the terminals.

According to another aspect of the present invention, there is provided an apparatus for receiving a communication history by a terminal in a communication system. The apparatus includes a transceiver; and a controller for sending a subscribe request for a communication history to a server through the transceiver, receiving from the server communication history information of all terminals registered in association with a user of the terminal, and storing the received communication history information in a memory.

Other aspects, advantages, and salient features of the invention will become apparent to those skilled in the art from the following detailed description, which, taken in conjunction with the annexed drawings, discloses embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Figure 1:
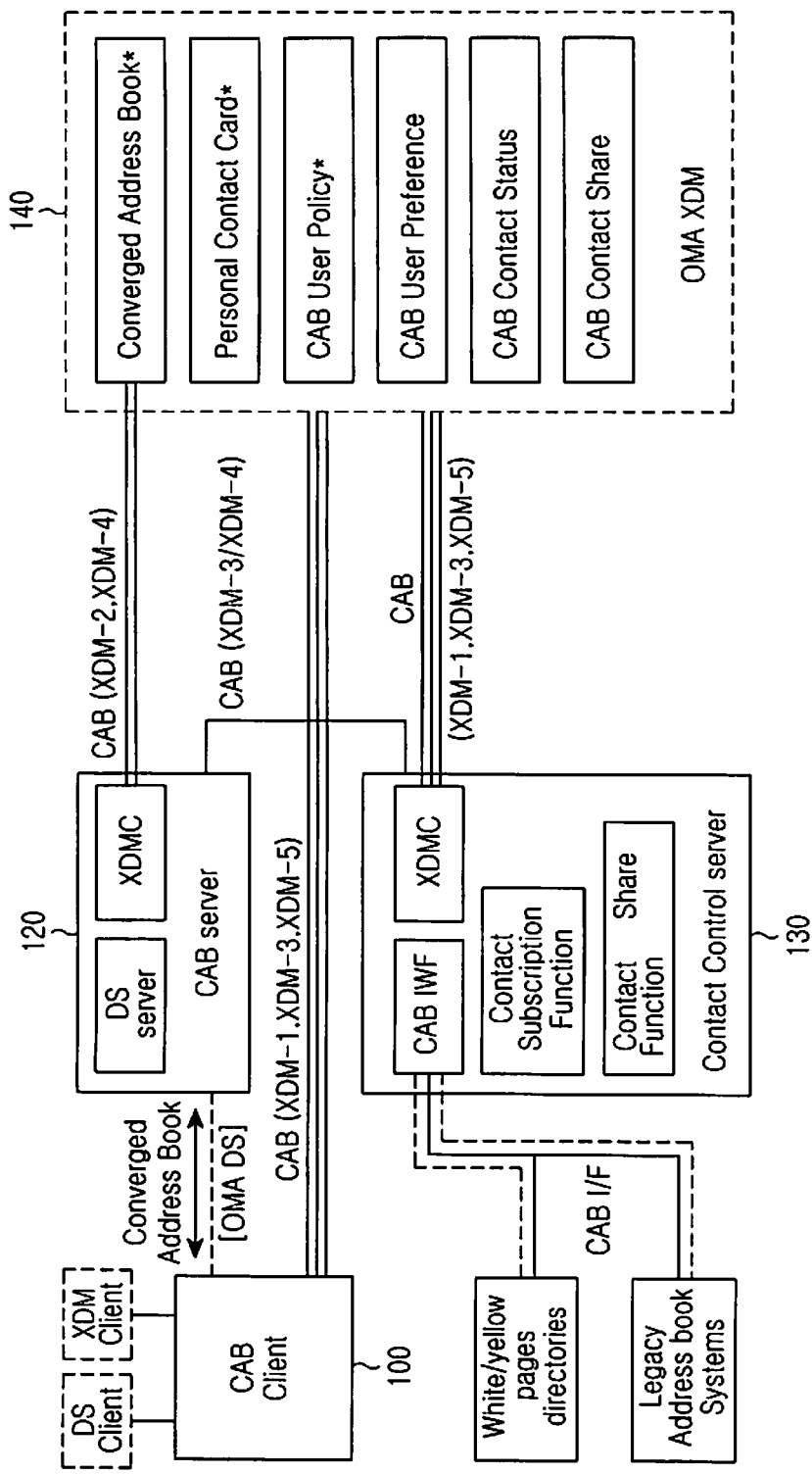
FIG. 1 illustrates architecture of a general SIP-based Converged Address Book (CAB) system.
Figure 2:
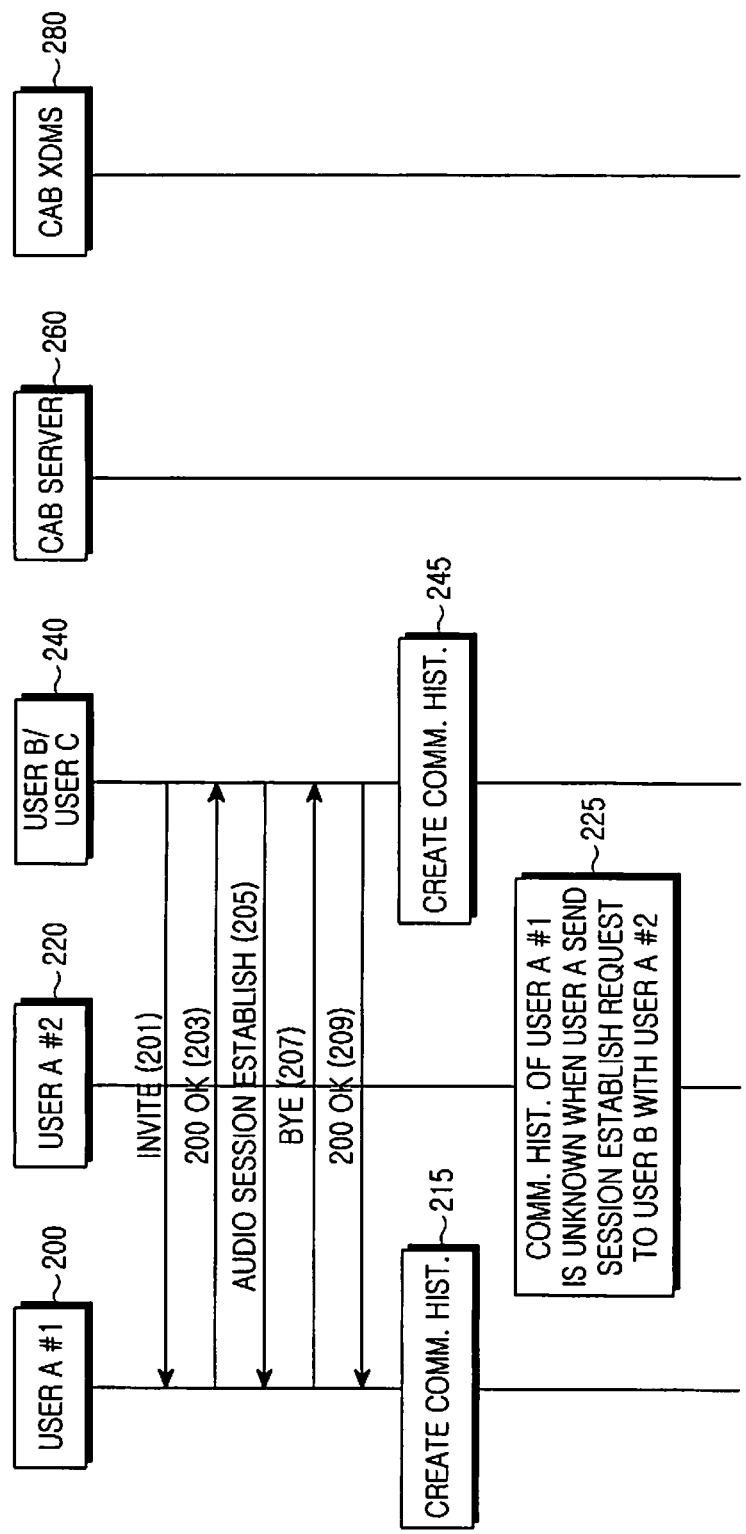
FIG. 2 illustrates signal transmission/reception for storing communication histories between a recipient having a plurality of terminals and a sender group.

Embodiment of the present invention will now be described in detail with reference to accompanying drawings. In the following description, descriptions of well-known functions and constructions are omitted for clarity and conciseness.

The present invention relates generally to a Converged Address Book (CAB) service or a single network-based address book service, which stores address information and a communication history so that the information can be used in a plurality of terminals owned by a single user in a Session Initiation Protocol/Internet Protocol (SIP/IP) core network, and which synchronizes the information so that the user can access the information with any terminal at anytime and anyplace, and more particularly, to a method and apparatus for allowing a user with a plurality of terminals to manage address information and a communication history existing in each of the terminals in a converged manner and to provide presence information based on the information, thereby offering a user an advantage of maintaining call continuity during a group call using the communication history.

In the present invention, a communication history that is included as a function of a CAB enabler refers to a record about all communications that have occurred in a terminal, and includes information about call types (outgoing call, incoming call, absence call, rejected call, etc.) and communication types, e.g., a voice call, a video call, a group call and various messaging services (SMS/Multi-media Message Service (MMS)/Session Initiation Protocol for IM and Presence Leveraging Extensions (SIMPLE), Instant Messaging (IM)/Push to Talk over Cellular (PoC)/Converged IP Messaging (CPM)/CAB, etc.), including the existing outgoing/incoming call list, and also includes a communication record regarding an address storage location such as a terminal address, a USIM address and an external memory's address.

The present invention provides a method for ensuring continuity of a history between terminals by providing a communication history including presence information between the communication parties concerned. More specifically, when terminals registered between the communication parties concerned conduct a subscribe request for a converged communication history, every terminal is notified of the communication history each time the communication history is created or updated. Then the user can perform continuous communication with active group members by being notified of communication history including presence information from a terminal other than the existing terminal used, thereby making it possible to improve user experiences as well.

The current Converged IP Messaging (CPM) service and Push to Talk over Cellular (PoC) service can store session history information and media in a Message & Media Storage (MMS) and a storage called a PoC Box, respectively. However, since these services depend upon preferences of users and policies of the service providers, the records may not be stored. In addition, because details about the session history is limited to the SIP header information, its value is relatively low in terms of diversity and utility, compared with the communication history information provided by the current terminals.

There is a need to overcome the limit of the session history information and obviously manage the communication history information that exists separately in every terminal. To this end, the present invention enables a user to make a subscribe request for a communication history of registered terminals and to receive changed information, thereby managing a communication history between the terminals, and deliver the communication history including presence information, thereby allowing a multi-terminal user to perform continuous communication using the communication history. A detailed description thereof will be made below.

Figure 3A:
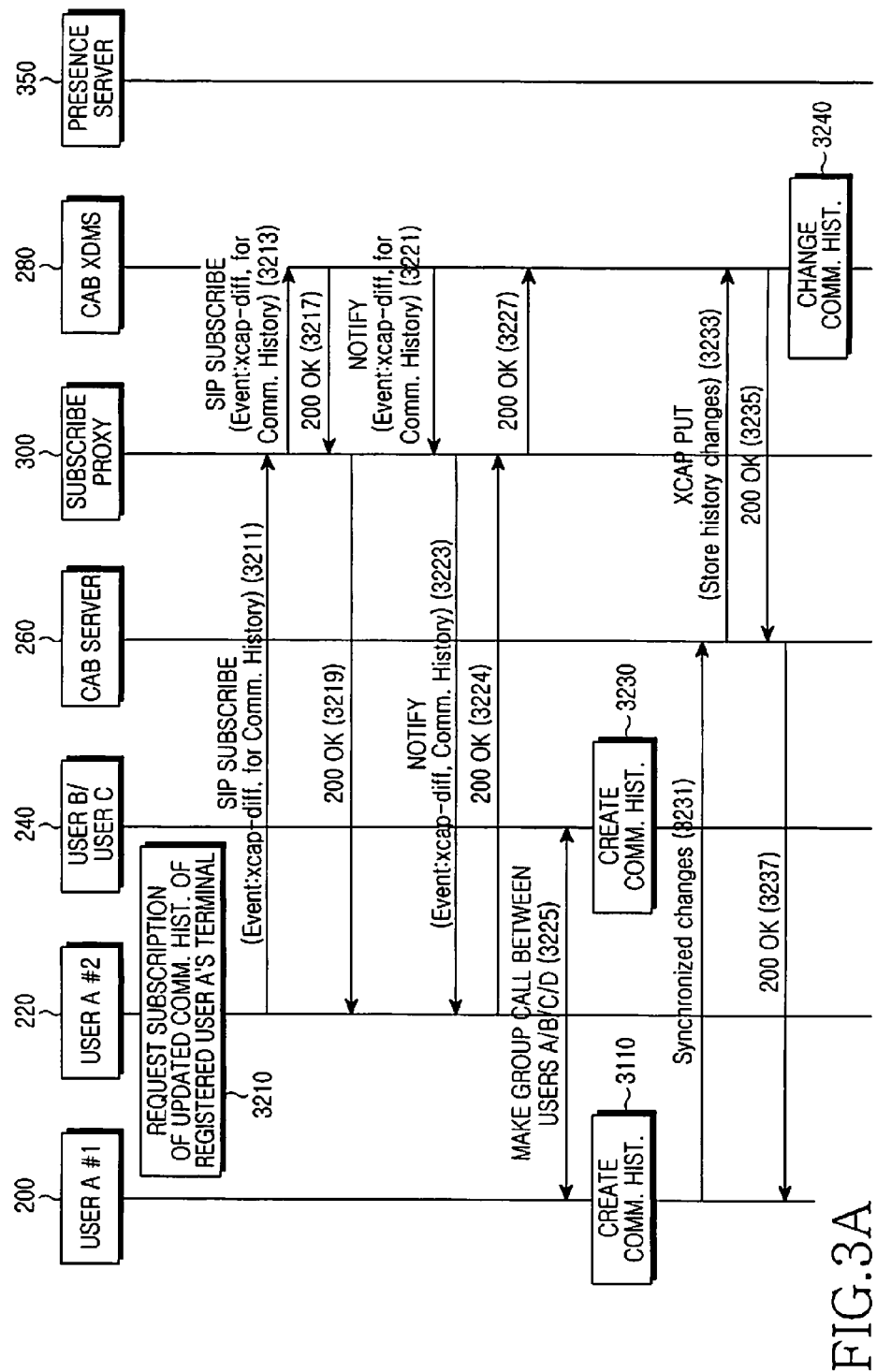
FIGS. 3A and 3B illustrate signal transmission/reception for making a group call by sharing a communication history including SIP-based presence information proposed by the present invention.
Figure 3B:
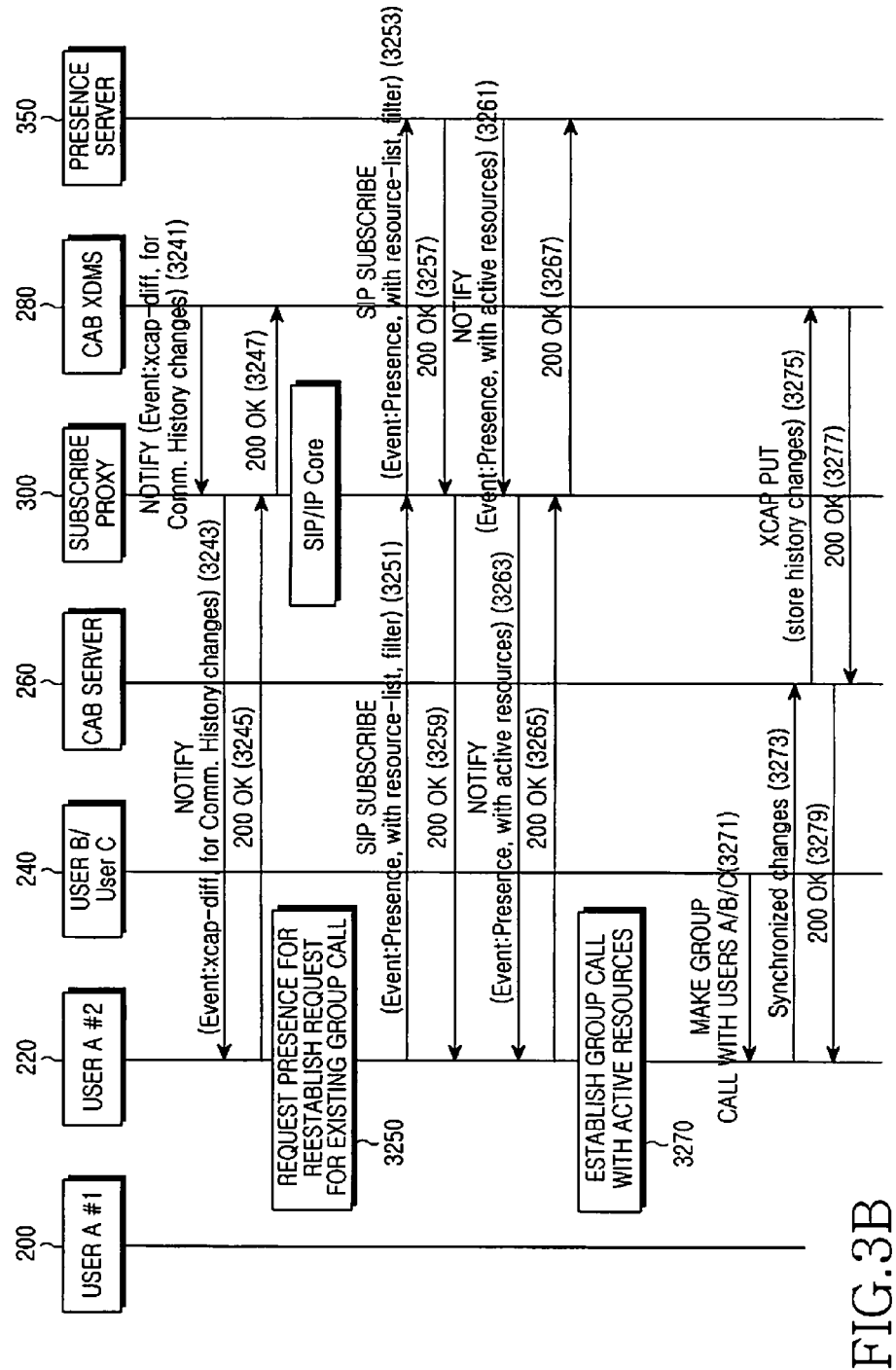

In FIGS. 3A and 3B, user A having two or more terminals performs a group call with group members (user B and user C) with the first terminal #1 200 in response to a group call invite message sent by user B 240, and then attempts a group call with active group members with the second terminal #2 220 of user A, using presence information included in an updated communication history.

FIGS. 3A and 3B illustrate a method for providing a communication history including presence information proposed by the present invention. A sender having a plurality of terminals sends a subscribe request for an updated communication history with the second terminal #2 220 of user A among two terminals used by the sender in order to smoothly make a group at a call later time in steps 3210, 3211, 3213, 3217 and 3219. Upon receipt of the subscribe request, a CAB XDMS 280 notifies the second terminal #2 220 of the existing communication history it has stored up to now with regard to user A in steps 3221, 3223, 3224 and 3227. Thereafter, if there is no changed communication history until the expiration of a subscribe request period, no notification will be made.

Thereafter, if a group call is made between user A and user B and then is ended, a communication history will be created in steps 3225, 3110 and 3230, and the created communication history will be stored in the CAB XDMS 280 in steps 3233 and 3240 through data synchronization between the first terminal #1 200 and a CAB server 260 in step 3231. The CAB XDMS 280 checks a subscription request authorization for the changed communication history, and then notifies the second terminal #2 220 of the authorization result in steps 3241, 3243, 3245 and 3247. The sender attempts a reestablish request for the existing group call in the second terminal #2 220 based on the notified communication history information for the group call in the first terminal #1 200 in step 3250. If the presence of the group members is provided, a connection/holding possibility for the group call connection can be ensured, remarkably helping improve the user's experiences. The sender acquires a resource list from the communication history, and then sends to a presence server 350 a presence subscribe request message with a filter for making a presence subscribe request for active resources in steps 3251 and 3253. The term "resource list" refers to a list of corresponding terminals, which is included in the communication history.

The presence server 350 checks the sender's authorization, and then notifies presence information only for the active resources (i.e. user B and user C) in the resource list in steps 3261, 3263, 3265 and 3267. The sender, which has acquired the presence information of the active group members (i.e. user A, user B and user C) among the group members that joined in the existing group call, performs a group call with user B and user C with the second terminal #2 220 of user A in Steps 3270 and 3271. After the group call is ended, communication history information regarding this is stored in the CAB XDMS 280 as before in steps 3273, 3275, 3277 and 3279.

Figure 4:
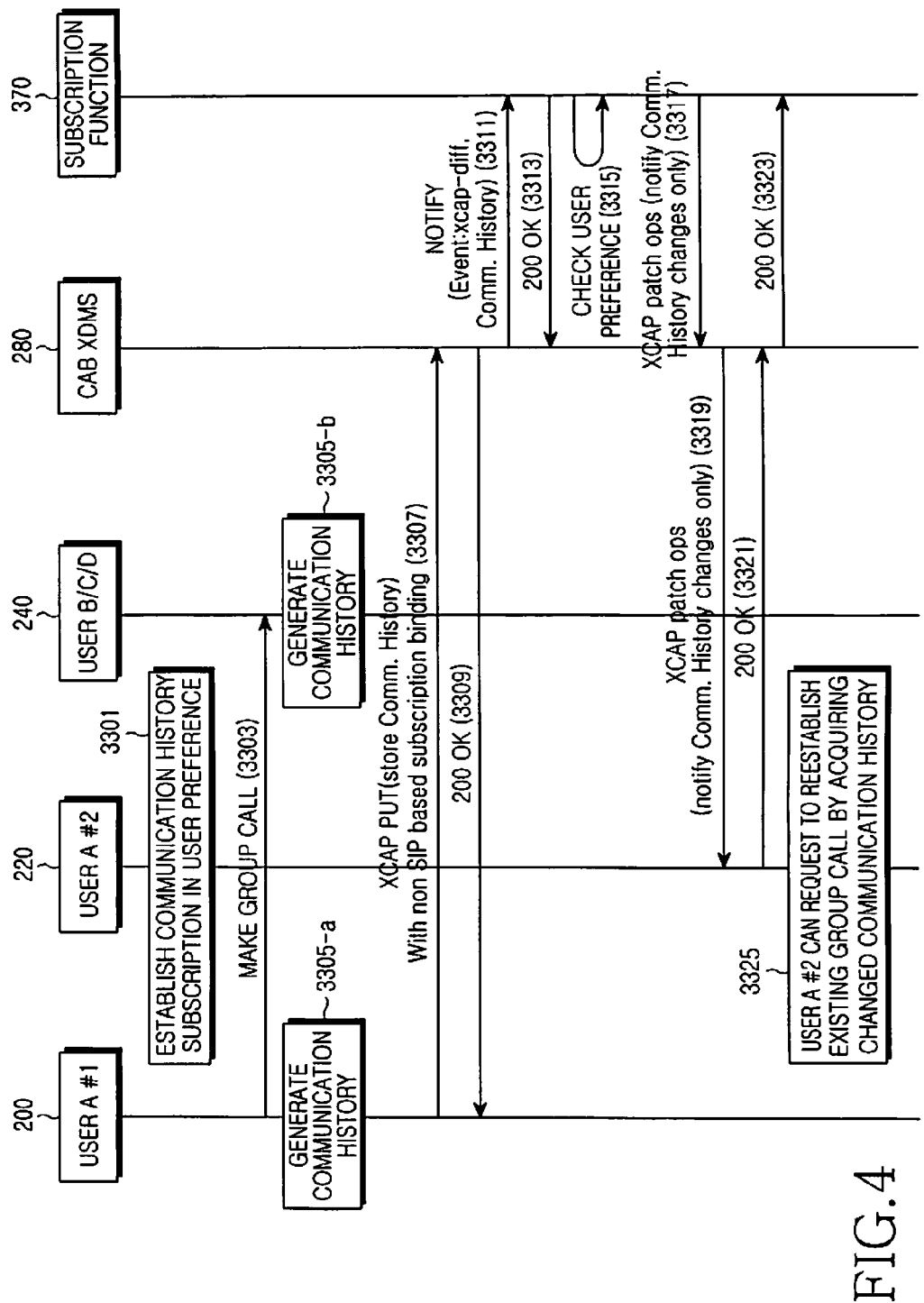
FIG. 4 illustrates a process of managing a communication history according to an embodiment of the present invention.

According to the present invention, the method for synchronizing communication history data between terminals and a server may include a synchronization process of FIG. 4 in addition to the synchronization process shown in FIGS. 3A and 3B. FIG. 4 shows a process of synchronizing communication history data using XCAP patch operations (RFC 5261) that are based on non SIP based subscription binding.

In FIG. 4, XCAP PUT is used for establishing non SIP based subscription binding to a CAB XDMS 280, checking a previously established user preference, and notifying an updated communication history to a related terminal.

Regarding a second terminal #2 220 of a user A, user A establishes a subscribe request in a user preference to receive updated information about a communication history of registered terminals in step 3301. Thereafter, if user A makes a group call with first terminal #1 200 in step 3303, a communication history generated using XCAP PUT is stored in the CAB XDMS 280 in steps 3305-a, 3305-b, 3307 and 3309. The user may attempt non SIP notification for synchronization of communication history data by transmitting a necessity for synchronization to other terminals and the change in communication history together through non SIP based subscription binding. Upon receiving XCAP PUT, the CAB XDMS 280 informs a subscription function 370 of the change in status of the communication history in steps 3311 and 3313. Upon receiving the status change information, the subscription function 370 checks a user preference to find registered terminals of the user, for which notification is required for communication history synchronization, in step 3315. Determining that the second terminal #2 220 of user A has previously set a communication history subscription function, the subscription function 370 transmits only the communication history updated using XCAP patch operations, to the user's second terminal #2 220 in steps 3317, 3319, 3321 and 3323. As a result, the second terminal #2 220 of user A can request reestablishment of the existing group call, and like in FIG. 3, can make again a group call based on presence information of the existing participators in step 3325.

As can be appreciated from the signal flow diagrams of FIGS. 3A, 3B, and 4, as a sending user can receive converged communication history information for its terminals, it is possible to solve the problem that the user may not acquire the communication history for a call received at one terminal, at another terminal. Also, the user can receive communication history information with the related presence information, thereby improving continuity of communication.

Table 1 through Table 5 show message formats for respective steps in the above signal flow diagrams.

Table 1 shows an example of a message that the second terminal #2 220 of user A sends to the CAB XDMS 280 to make a subscribe request for an updated communication history. "xcap-diff" is used as an event package to receive an updated XML document, and a new format defining a communication history proposed by the present invention is required as the Content-Type. The following XML document shows a Uniform Resource Identifier (URI) used for subscribing a communication history of user A, which is stored in a communication history storage.

TABLE 1

SUBSCRIBE sip:alice.cafe@example.com;auid=org.openmobilealliance.comm_historiesSIP/2.0
Via: SIP/2.0/UDP [5555::aaa:bbb:ccc:ddd]:1357;comp=sigcomp;branch=z9hG4bKnashds7
Max-Forwards: 70
Route: <sip:pcscf1.visited1.net:7531;lr;comp=sigcomp>, <sip:orig@scscf1.home1.net;lr>
From: <sip:alice2.cafe@example.com>;tag=31415
To: <sip:alice.cafe@example.com>
Event: xcap-diff
Call-ID: b89rjhnedlrfjflslj40a222
CSeq: 85 SUBSCRIBE

TABLE 1-continued

```
P-Preferred-Identity: "Alice2 Cafe" <sip:Alice2.cafe@example.com>
Privacy: none
Expires: 600000
Accept: application/xcap-diff+xml
Contact: <sip:[5555::aaa:bbb:ccc:ddd]:1357;comp=sigcomp>
Content-Type: application/communication-histories+xml
Content-Length: ..
<?xml version="1.0" encoding="UTF-8"?>
<communication-history xmlns="urn:ietf:params:xml:ns:communication-histories">
    <list>
        <entry uri="org.openmobilealliance.comm_histories/user
        s/sip:alice./communication_histories"/>
    </list>
</communication-history >
```

Table 2 shows an example of a message used to store in the CAB XDMS 280 the communication history newly created by the first terminal #1 200 of user A who has made a group call with user B in step 3233. A list to which the created communication history belongs corresponds to an incoming group call, and a reference address of the communication history is "SIP:112233@comm_historyserver.example.com." A sender is user B 240, and is followed by a contact type (e.g. contact type_"home", "office", "abroad", etc.), a contact number, a date time, a call time, and group call participant information (i.e. participants). The example of Table 2 shows a basic format of the communication history, and can provide more abundant communication history information according to the terminals.

TABLE 2

```
PUT/org.openmobilealliance.communication-
histories/users/sip:alice.cafe@example.com/communication_histories.xml
HTTP/1.1
Host: xcap.example.com
...
Content-Type: application/communication-histories+xml
```

TABLE 2-continued

```
Content-Length: (...)
<?xml version="1.0" encoding="UTF-8"?>
<communication-histories
xmlns="urn:ietf:params:xml:ns:communication-histories">
    <communication_histories>
        <history list="incoming_group_call"
history_reference="sip:112233@comm_historyserver.example.com">
            <entry name="Bob">
                <contact type="home">031-111-2222</contact>
                <datetime>2008-01-10T19:20:49+09:00</datetime>
                <calltime>00:04:30</calltime>
                <participants>
                    <entry name="Jane" uri="sip:jane@example.com"/>
                    <entry name="Tom" uri="sip:tom@example.com"/>
            </entry>
        </history>
</communication_histories>
```

Table 3 shows a message used to notify the newly stored communication history in response to a subscribe request from the second terminal #2 220 of user A at step 3241. The CAB XDMS 280 sends the terminal a new entry called "sip:112233@comm_historyserver.example.com."

TABLE 3

```
NOTIFY sip:[5555::aaa:bbb:ccc:ddd]:1357;comp=sigcomp SIP/2.0
Via: SIP/2.0/UDP cabxdms1.home1.net;branch=z9hG4bK332b23.1
Max-Forwards: 70
Route: <sip:scscf1.home1.net;lr>, <sip:pcscf1.visited1.net:7531;lr;comp=sigcomp>
From: <sip:alice.cafe@example.com>;tag=31415
To: <sip:alice2.cafe@example.com>;tag=151170
Call-ID: b89rjhnedlrfjflslj40a222
CSeq: 112 NOTIFY
Subscription-State: active;expires=600000
Event: xcap-diff
Content-Type: application/xcap-diff+xml
Contact: <sip:cabxdms1.home1.net>
Content-Length: (...)
<?xml version="1.0" encoding="UTF-8"?>
    <xcap-diff xmlns="urn:ietf:params:xml:ns:xcap-diff" xmlns:och="
urn:ietf:params:xml:ns:communication-histories"xcap-root="http://xcap.example.com">
        <document previous-etag="7ahggs"sel="org.openmobilealliance.comm_histories/user
s/sip:alice.cafe@example.com/communication_histories"
        new-etag="ffds66a">
            <change-log>
                <add sel="och:group/och:communication_histories/l:list">
                    <och:entry och:uri="sip:112233@comm_historyserver.example.com">
                </add>
            </change-log>
        </document>
    </xcap-diff>
```

Table 4 shows an example of a message with which user A makes a subscribe request for a presence by using a resource list from a communication history as a filter in order to resume the existing group call with the second terminal #2 220 at step 3251. The second terminal #2 220 of user A sends a request for presence information to each of the first terminal #1 200 of user A, and a group 240 of user B, user C and user D.

TABLE 4

SUBSCRIBE sip:alice.cafe@example.com;auid=org.openmobilealliance.presence SIP/2.0
Via: SIP/2.0/UDP [5555::aaa:bbb:ccc:ddd]:1357;comp=sigcomp;branch=z9hG4bKnashds7
Max-Forwards: 70
Route: <sip:pcscf1.visited1.net:7531;lr;comp=sigcomp>, <sip:orig@scscf1.home1.net;lr>
From: <sip:alice2.cafe@example.com>;tag=31415
To: <sip:alice.cafe@example.com>
Call-ID: 32432udfidfjmk342
Cseq: 1 SUBSCRIBE
P-Preferred-Identity: "Alice2 Cafe" <sip:Alice2.cafe@example.com>
Expires: 3600
Accept: multipart/related
Accept: application/rlmi+xml
Event: Presence
Contact: sip: alice2.cafe@example.com
Content-Type: application/simple-filter+xml
Content-Length: (...)
<?xml version="1.0" encoding="UTF-8"?>
<filter-set xmlns="urn:ietf:params:xml:ns:simple-filter">
<ns-binding prefix="pidf" urn="urn:ietf:params:xml:ns:pidf"/>
<filter id="123" uri="sip:alice1.cafe@example.com">
<what>
<include type="xpath">
//pidf:tuple/pidf:status[pidf:basic="open"]/pidf:basic
</include>
</what>
</filter>
<filter id="124" uri="sip:bob@example.com">
<what>
<include type="xpath">
//pidf:tuple/pidf:status[pidf:basic="open"]/pidf:basic
</include>
</what>
</filter>
<filter id="125" uri="sip:jane@example.com">
<what>
<include type="xpath">
//pidf:tuple/pidf:status[pidf:basic="open"]/pidf:basic
</include>
</what>
</filter>
<filter id="126" uri=" sip:tom@example.com">
<what>
<include type="xpath">
//pidf:tuple/pidf:status[pidf:basic="open"]/pidf:basic
</include>
</what>
</filter>
</filter-set>

Table 5 shows a message used to notify presence information, to which a filter regarding a resource list's status, or resulting information for the request of Table 4, is applied at step 3261. It is noted that, as shown in the message, user B and user C are in an "online" state. Based on this information, user A may attempt a group call to pertinent recipients with the second terminal #2 220.

TABLE 5

NOTIFY sip:[5555::aaa:bbb:ccc:ddd]:1357;comp=sigcomp SIP/2.0
Via: SIP/2.0/UDP cabxdms1.home1.net;branch=z9hG4bK332b23.1
Max-Forwards: 70
Route: <sip:scscf1.home1.net;lr>,
<sip:pcscf1.visited1.net:7531;lr;comp=sigcomp>
From: <sip:alice.cafe@example.com>;tag=31415
To: <sip:alice2.cafe@example.com>;tag=151170

TABLE 5-continued

Call-ID: b89rjhnedlrfjflslj40a222
CSeq: 112 NOTIFY
Subscription-State: active;expires=600000
Event: Presence
Contact: sip: alice.cafe@example.com TABLE 5-continued Content-Type: application/pidf+xml
Content-Length: (...)
<?xml version="1.0" encoding="UTF-8"?>
<presence xmlns="urn:ietf:params:xml:ns:pidf"
entity="sip:alice@example.com">

TABLE 5-continued

```
<basic>closed</basic>
</status>
</tuple>
<tuple id="126">
<status>
<basic>open</basic>
</status>
</tuple>
</presence>
```

An example of notifying the updated communication history using XCAP patch operations of step 3307 of FIG. 4, the general message formats are shown in Table 6 and Table 7.

The message of Table 6 carries sync="active" and status="update" to the CAB XDMS 280, wherein sync="active" indicates that the generated communication history needs synchronization, and status="update" indicates that as it is stored in the CAB XDMS 280, synchronization to other registered terminals is needed.

TABLE 6

```
PUT/org.openmobilealliance.communication-
histories/users/sip:alice.cafe@example.com/communication_histories.xml HTTP/1.1
Host: xcap.example.com
...
Content-Type: application/communication-histories+xml
Content-Length: (...)
<?xml version="1.0" encoding="UTF-8"?>
<communication-histories xmlns="urn:ietf:params:xml:ns:communication-histories">
<communication_histories status="update" sync="active">
<history id="a111" list="incoming_group_call"
history_reference="sip:112233@comm_historyserver.example.com">
        <entry name="Bob">
                <contact type="home">031-111-2222</contact>
                <datetime>2008-01-10T19:20:49+09:00</datetime>
                <calltime>00:04:30</calltime>
                <participants>
                    <entry name="Jane" uri="sip:jane@example.com"/>
                    <entry name="Tom" uri="sip:tom@example.com"/>
        </entry>
    </history>
</communication_histories>
```

Table 7 shows an example of a message with which the subscription function 370, which has determined from SDMS in a user preference of user A that subscription to a communication history of the second terminal #2 220 of user A is requested, transmits the communication history updated with the XCAP patch operations to the second terminal #2 220 of user A as set forth in step 3319.

TABLE 7

```
PUT /org.openmobilealliance.communication-
histories/users/sip:alice2.cafe@example.com/communication_histories.xml HTTP/1.1
Host: xcap.example.com
...
Content-Type: application/communication-histories+xml
Content-Length: (...)
<?xml version="1.0" encoding="UTF-8"?>
<p:communication-histories xmlns="urn:ietf:params:xml:ns:communication-histories">
<p:add sel="communication-histories/history[@id='a111']" type="@list">incoming_group_call</p:add>
<p:add sel="communication-histories/history[@id='a111']" type="@history_reference">
sip:112233@comm_historyserver.example.com</p:add>
<p:add sel="communication-histories/history[@id='a111']">
    <entry name="Bob">
        <contact type="home">031-111-2222</contact>
        <datetime>2008-01-10T19:20:49+09:00</datetime>
        <calltime>00:04:30</calltime>
        <participants>
            <entry name="Jane" uri="sip:jane@example.com"/>
            <entry name="Tom" uri="sip:tom@example.com"/>
    </entry>
</p:add>
</p:communication_histories>
```

Figure 5:
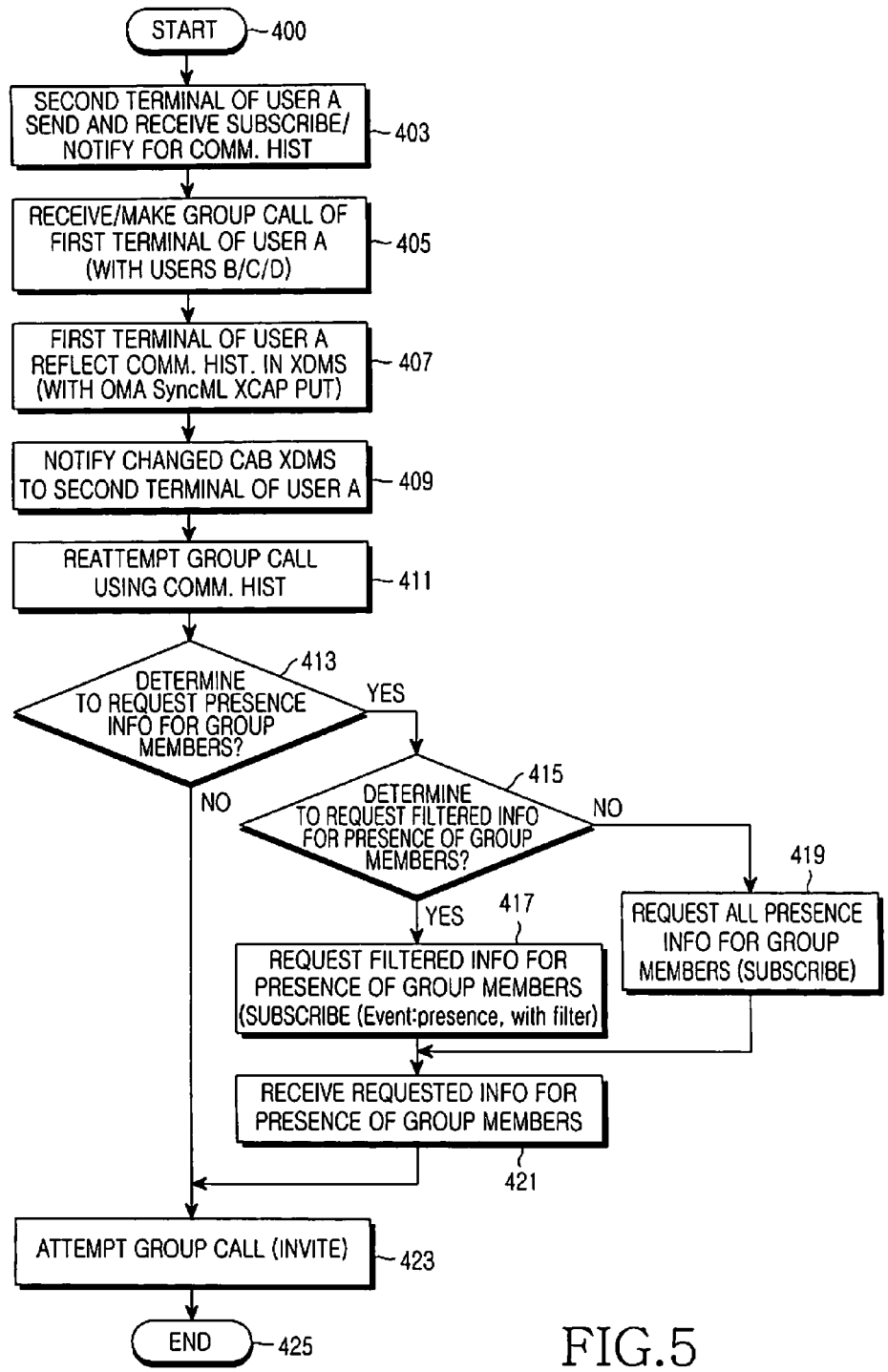
FIG. 5 illustrates a process of providing a communication history according to an embodiment of the present invention.

FIG. 5 illustrates a generalized process of an operation in which, as described above, a user having a plurality of terminals collectively manages communication histories existing the respective terminals and provides presence information thereto.

Referring to FIG. 5, user A sends a subscribe request for a communication history and receives a notification in response thereto using the second terminal #2 220 in step 403. Specifically, a controller of the second terminal #2 220 sends a subscribe request for a communication history through a transceiver in the terminal. The controller controls the overall operation of the second terminal #2 220, and the transceiver, under the control of the controller, wirelessly transmits data to an external device, or receives data from the external device and delivers the received data to the controller.

User A receives a group call from user B using the first terminal #1 200, and performs group call communication with user C and user D together in step 405. When the group call is ended, the first terminal #1 200 of user A stores a created communication history in its communication history XDMS using Open Mobile Alliance (OMA) Synchronization Mark-up Language (SyncML) and XML Configuration Access Protocol (XCAP) PUT in step 407. Then the controller of the first terminal #1 200 transmits its communication history to the CAB XDMS 280 through the transceiver.

In reply to the subscribe request, the second terminal #2 220 of user A is notified of the updated communication history information from the CAB XDMS 280 in Step 409. Then the second terminal #2 220 receives the communication history information transmitted from the CAB XDMS 280 through the transceiver, and stores the received communication history information in a memory.

User A reattempts a group call with the second terminal #2 220 if needed, using the notified communication history in step 411. Upon receipt of an input by user A, the second terminal #2 220 determines whether or not to request presence information for group members that made the existing group call in step 413. If the second terminal #2 220 determines not to request the presence information, user A will request a simple group call, and accordingly, the controller of the second terminal #2 220 requests the simple group call using the communication history information in step 423. However, when the second terminal #2 220 determines to request the presence information, user A determines whether or not to request filtered presence information in step 415. When user A determines to request filtered presence information for the group members, the controller of the second terminal #2 220 sends a subscribe request for filtered information for a presence of the group members through the transceiver (SUBSCRIBE(Event: presence, with filter)) in step 417. If the user A determines not to request filtered presence information for the group members, the user A sends a subscribe request for presence information for all group members (SUBSCRIBE) (Step 419). Then the controller of the second terminal #2 220 sends a request for presence information for all group members to the presence server 350 by means of the transceiver. As the second terminal #2 220 receives the presence information from the presence server 350 through the transceiver, user A is notified of the requested information for the presence of group members in step 421. User A attempts a group call with active group members based on the notified presence information of group members (INVITE) in step 423.

In this manner, when reattempting the group call using the communication history, the user having a plurality of terminals can make a call with the active group members, and can also share the communication history using his/her other terminals.

As is apparent from the foregoing description, in the method and apparatus proposed by the present invention, when registered terminals of a sender make a subscribe request for a communication history, every terminal is notified of the communication history each time the communication history is created or updated. As a terminal other than the existing terminal provides the communication history including presence information, the user or sender can perform continuous communication with active group members, thereby improving user experiences.

Embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, Read-Only Memory (ROM), Random-Access Memory (RAM), CD-ROMs, magnetic tapes, floppy disks, an optical data storage devices. The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for managing communication histories of terminals using a server, the method comprising the steps of:
sending, to the server, a registration request of at least one terminal for receiving a communication history, the communication history including at least one of call types, communication types and messaging service types;
sending, to the server, a subscriber request for a communication history of a particular user;
receiving, from the server, communication history information of all terminals registered in association with the particular user;
storing the received communication history information in a memory;
sending a request for presence information for at least one corresponding terminal, which is included in the communication history information; and
receiving presence information for the at least one corresponding terminal.

2. The method of claim 1, further comprising:
determining whether to request a filtered presence information for the at least one corresponding terminal before sending the request for presence information,
wherein the request for presence information includes a result of the determination.

3. The method of claim 2, further comprising:
delivering a new communication history to the server when a new communication history occurs after the terminal communicates with an arbitrary terminal;
receiving from the server the communication history information including the new communication history; and storing the received communication history information.

4. The method of claim 1, further comprising requesting presence information for a particular terminal in a presence state among corresponding terminals included in the communication history information.

5. The method of claim 1, further comprising displaying the communication history information upon user request.

6. The method of claim 1, further comprising communicating with a terminal that is selected by the user from among corresponding terminals included in the communication history information.

7. The method of claim 1, wherein the communication history information includes at least one of a contact type, a contact number, a date time, and a call time for a corresponding terminal included in the communication history information.

8. The method of claim 1, wherein the subscriber request includes an event package for receiving an updated Extensible Markup Language (XML) document and a Content-Type for defining the updated XML document as communication history.

9. The method of claim 8, wherein the subscriber request includes a SIP SUBSCRIBE message.

10. A method for managing communication histories of terminals in a server, the method comprising the steps of:
  receiving, from a terminal, a registration request of at least one terminal for receiving a communication history, the communication history including at least one of call types, communication types and messaging service types;
  registering the at least one terminal in the server as a receiving terminal for receiving the communication history information of all terminals registered in association with a user of the at least one terminal;
  receiving, from the terminal, a subscriber request for a communication history;
  transmitting the communication history information of all terminals registered in association with a user of the terminal, to the terminal;
  receiving from the terminal a request for presence information for at least one corresponding terminal, which is included in the communication history information; and
  delivering to the terminal presence information for the at least one corresponding terminal.

11. The method of claim 10, further comprising:
  determining whether to request a filtered presence information by analyzing the request for presence information.

12. The method of claim 11, further comprising:
  receiving from the terminal a newly generated communication history; and
  transmitting to the terminal the communication history information including the newly generated communication history.

13. An apparatus for managing communication history of terminals using a server, the apparatus comprising:
  a transceiver; and
  a controller for sending, to the server, a registration request of at least one terminal for receiving a communication history, the communication history including at least one of call types, communication types and messaging service types, sending a subscribe request for a communication history of a particular user to the server through the transceiver, receiving from the server communication history information of all terminals registered in association with the of particular user of the terminal, storing the received communication history information in a memory of the terminal, sending through the transceiver a request for presence information for at least one corresponding terminal, which is included in the communication history information, and receiving presence information for the at least one corresponding terminal.

14. The apparatus of claim 13, wherein the controller
  determines whether to request a filtered presence information for the at least one corresponding terminal before sending the request for presence information,
  wherein the request for presence information includes a result of the determination.

15. The apparatus of claim 13, wherein the controller delivers, through the transceiver, a new communication history to the server when the new communication history occurs after performing communication with an arbitrary terminal, receives from the server the communication history information including the new communication history, and stores the received communication history information in the memory.

16. The apparatus of claim 13, wherein the controller requests presence information for a particular terminal in a presence state among corresponding terminals included in the communication history information.

17. The apparatus of claim 13, wherein the controller displays the communication history information upon user request.

18. The apparatus of claim 13, wherein the controller performs communication with a terminal that is selected by the user from among corresponding terminals included in the communication history information.

19. The apparatus of claim 13, wherein the communication history information includes at least one of a contact type, a contact number, a date time, and a call time for a corresponding terminal included in the communication history information.

20. The method of claim 1, wherein the call types include outgoing call, incoming call, absence call, and rejected call, the communication types include a voice call, a video call and a group call, and the messaging service types include SMS (Short Message Service), MMS (multi-media message service), SIMPLE (Session Initiation Protocol for IM and Presence Leveraging Extensions) IM (Instant Messaging) service, PoC (Push to Talk over Cellular) service, CPM (converged IP messaging) service, and CAB (Converged Address Book) service.

21. The method of claim 10, wherein the call types include outgoing call, incoming call, absence call, and rejected call, the communication types include a voice call, a video call and a group call, and the messaging service types include SMS (Short Message Service), MMS (multi-media message service), SIMPLE (Session Initiation Protocol for IM and Presence Leveraging Extensions) IM (Instant Messaging) service, PoC (Push to Talk over Cellular) service, CPM (converged IP messaging) service, and CAB (Converged Address Book) service.

22. The apparatus of claim 13, wherein the call types include outgoing call, incoming call, absence call, and rejected call, the communication types include a voice call, a video call and a group call, and the messaging service types include SMS (Short Message Service), MMS (multi-media message service), SIMPLE (Session Initiation Protocol for IM and Presence Leveraging Extensions) IM (Instant Messaging) service, PoC (Push to Talk over Cellular) service, CPM (converged IP messaging) service, and CAB (Converged Address Book) service.

* * * * *